United States Patent [19]

Toback

[11] 3,822,585

[45] July 9, 1974

[54] LEAK TESTER FOR BATTERIES

[75] Inventor: Henry Toback, New Ringgold, Pa.

[73] Assignee: General Battery Corporation, Reading, Pa.

[22] Filed: Sept. 5, 1972

[21] Appl. No.: 286,067

[52] U.S. Cl. .............................................. 73/49.2
[51] Int. Cl. ........................................... G01m 3/26
[58] Field of Search ............... 73/40, 47, 49.2, 49.7

[56] References Cited
UNITED STATES PATENTS 3,529,463   9/1970   Orlando et al. ...................... 73/49.2

Primary Examiner—Richard C. Queisser
Assistant Examiner—Joseph W. Roskos
Attorney, Agent, or Firm—Paul & Paul

[57] ABSTRACT

A device is provided, for testing batteries for leaks, preferably adapted for the testing of batteries in a "dry" condition, prior to introduction of liquid (acid) thereinto. The device is adapted to be engaged and applied to a battery, with inlets disposed over cell openings of a plurality of cells of the battery, with gas (generally compressed air) being provided at some predetermined level of pressure to the batteries, and for giving a visual indication regarding pressure of a plurality of cells at the same time. The device is constructed to be adjustable for accommodating variously sized batteries.

9 Claims, 4 Drawing Figures

LEAK TESTER FOR BATTERIES

BACKGROUND OF THE INVENTION

In the construction of batteries, particularly at the termination of their construction, it is desirable to test the battery for leaks in the cells, under predetermined pressure, so that the leaks can be determined prior to introduction of acid therein, in order to reduce or eliminate the possibility of rejects by virtue of battery leakage.

In conjunction with the foregoing, it has become commonplace to apply pressurized air to a given battery cell, and to take a reading with respect thereto, by a pressure gauge or the like, but this simple method often may not indicate the presence of minor leaks, particularly if the leak is sufficiently small that incoming air from the pressurized source compensates for the minor leak, thereby yielding a false or misleading reading on a gauge or the like.

THE PRESENT INVENTION

This invention is directed toward providing a device that is adapted for testing various sized batteries for leaks, and which therefore is adjustable in order to accommodate various sized batteries. This invention is also adjustable for accommodating batteries with various numbers of cells, for example, a four-cell battery, a six-cell battery, etc. This is accomplished by delivering pressurized air to individual testing units that are disposed in seated relation to alternate (every other one) cells, through check valves that prevent a backflow of pressure. Once the device is disposed with testing units applied to a cell, pressurized air communicates with the cell, the unit, and a gauge, and with the device being adapted to terminate the supply of air through the check valves, in order that the gauges may indicate if a given cell has the capacity to hold air under a given pressure.

The device of this invention is adapted not only for indicating if there is a leak with respect to a given cell, but by using the device such that first one series of cells (for example cells one, three and five of a given battery) and then another set of intermediate cells (such as cells two, four, and six of a six-celled battery) are checked. Thus it can be determined, if there is an unsatisfactory (low) reading with respect to two adjacent cells, if the leak is in the wall between two adjacent cells, or if it is in a wall between the cell and outside the battery. This latter feature is particularly important in the event that the battery is to be repaired, for indicating the location wherein repair is necessary.

SUMMARY OF THE INVENTION

A testing device is provided, for use in determining the existence of leaks in battery cells, wherein individual gas supply devices, capable of holding pressurized gas (for example, air) in a non-leaking cell are disposed in openings of a plurality of battery cells, and with means being provided for indicating whether or not the cells are holding the desired amount of pressure.

Accordingly, it is a primary object of this invention to provide a novel testing device for determining the existence of leaks in battery cells.

It is a further object of this invention to accomplish the above object, whether it may also be determined if the leaks are through walls that separate adjacent cells, or if they are through an outside cell wall.

It is another object of this invention to provide a battery leak-testing device, which is adaptable for use with various sized batteries.

It is a further object of this invention to provide a novel battery testing device that is adjustable for accommodating batteries with various numbers of cells.

It is another object of this invention to provide a battery testing device adaptable for use with a readily available pressure-testing source, for example, a source of compressed air.

It is still another object of this invention to provide a novel method of testing batteries for leaks.

Other objects and advantages of the present invention will be readily apparent to those skilled in the art from a reading of the following brief description of the drawing figures, the detailed description of the preferred embodiment, and the appended claims.

IN THE DRAWINGS

FIG. 1 is a perspective view of a testing device, in accordance with this invention, FIG. 2 is a front elevational view of the testing device of FIG. 1, shown in a battery-testing position, with respect to a battery, FIG. 3 is a sectional view, taken generally in plan along the line III—III of FIG. 1, and wherein the interior of one of the cell-mountable members is illustrated, FIG. 4 is a vertical sectional view taken through the same cell-mounted member illustrated in FIG. 3, generally along the line IV—IV of FIG. 1, and wherein the manner of seating the member over a battery cell opening is illustrated.

DESCRIPTION OF THE PREFERRED EMBODIMENT

Figure 1:
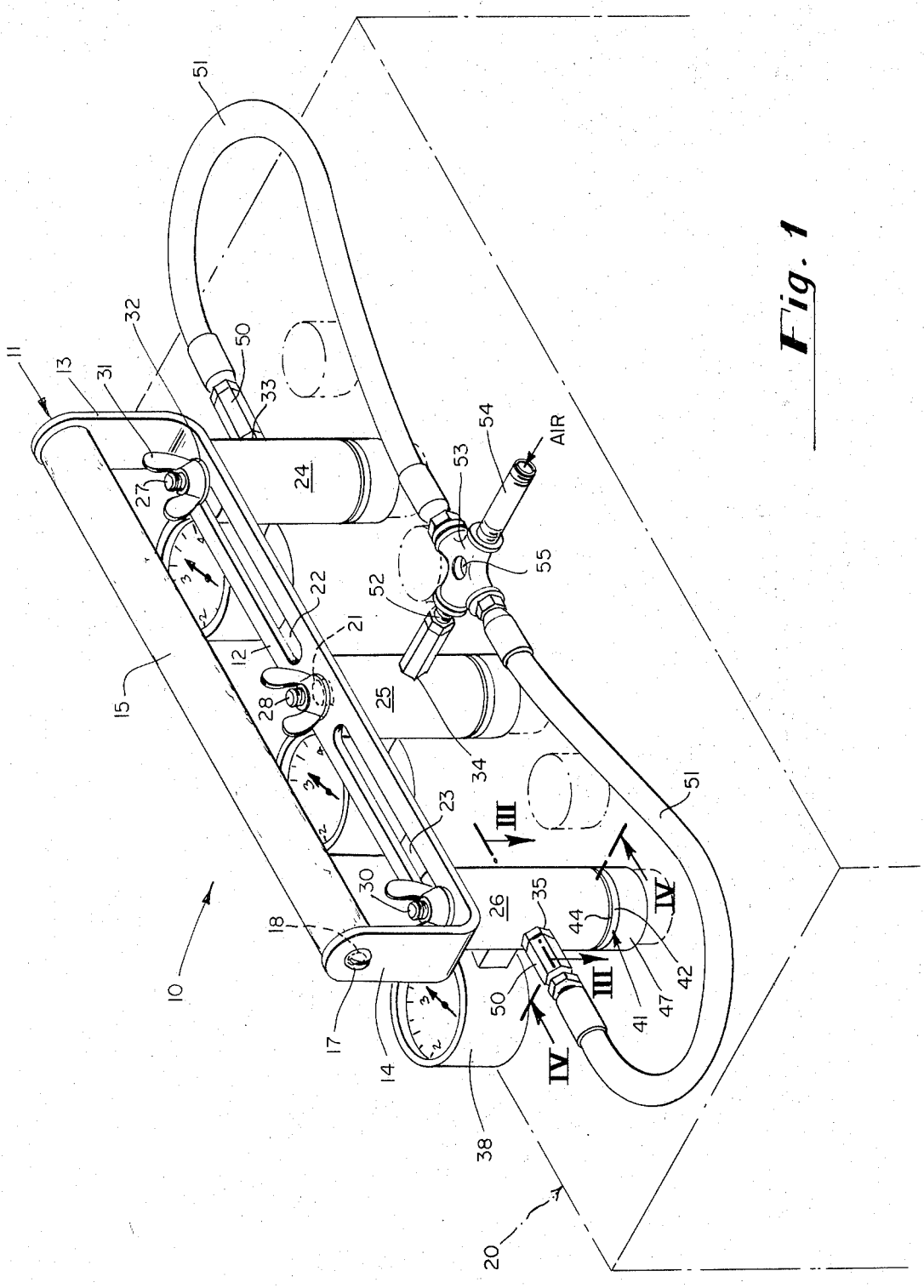
Figure 2:
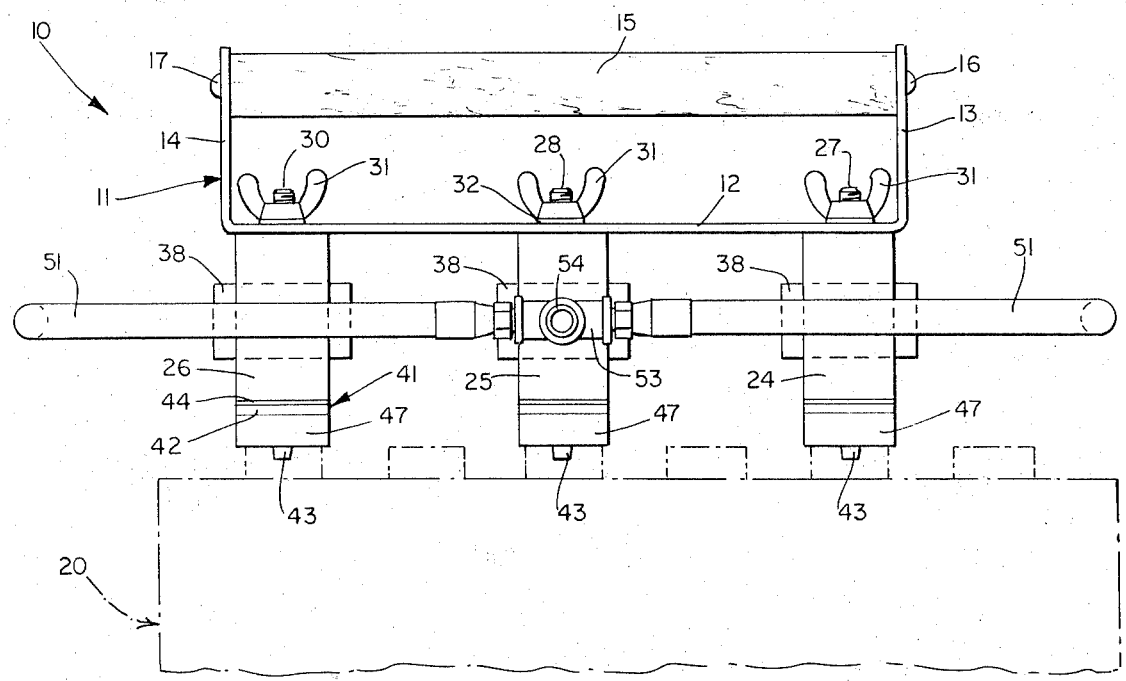
Figure 4:
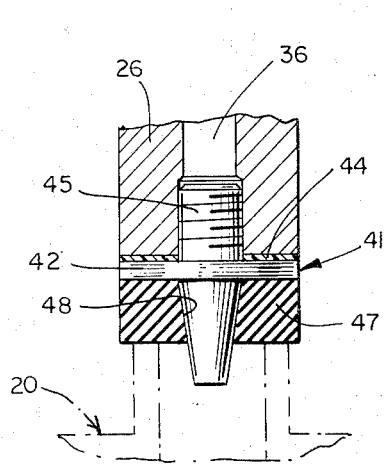
Figure 3:
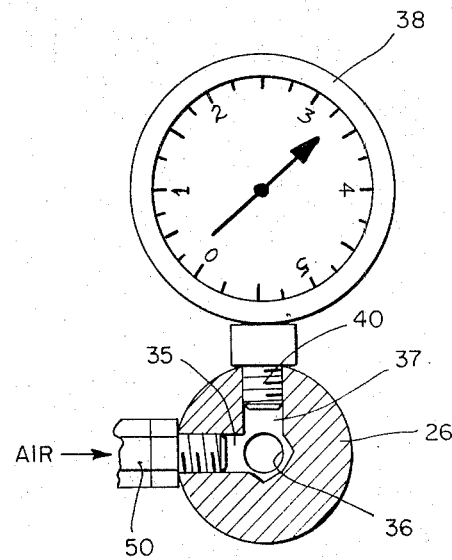

Referring now to the drawings in detail, reference is first made to FIG. 1, wherein the testing device generally designated by the numeral 10, of this invention is illustrated, as comprising a generally U-shaped member or head plate 11, having a base portion 12, and upstanding legs 13 and 14 at ends thereof. A handle 15 is disposed between the upper terminal ends of the portions 13 and 14, secured thereto by suitable screw fasteners 16 and 17 or the like, in engagement with ends of the handle 15, through holes 18 in the head plate portions 13 and 14. Thus, the handle 15 facilitates the ready lifting and placement of the device 10 onto a battery such as that 20 illustrated in phantom in FIGS. 1 and 2.

The base portion 12 of the head plate 11 is provided with a center hole 21, and a pair of elongated slotted holes 22 and 23, each of which extend from a generally central position of the base portion 12, almost to associated upstanding legs 13 and 14.

Three gas-receiving fill tubes or members 24, 25 and 26, are provided, having threaded protrusions 27, 28 and 30, respectively, for disposition through associated ones of the holes 22, 21, and 23, as illustrated in FIG. 1, for securement in position by threaded wing-nuts 31 in engagement against washers 32, as illustrated. It will be apparent that the member 25 is generally fixed in position longitudinally of the head plate or bracket 11, but that the members 24 and 26 are longitudinally movable by loosening their associated wing-nuts such as 31, sufficient to enable sliding of such member along its associated slotted hole 22 or 23, followed by tightening of the associated wing-nut, for positioning of the members 24, 25 and 26, in order to accommodate various sized batteries, having openings thereof in cells that are disposed at various distances from one another. It will also be apparent that either of the members 24 and 26 may be disconnected from the head plate or bracket 11, and that only the other of such members 24 and 26 would be used in conjunction with the member 25, in the event that, for example, a four-cell battery were desired to be checked.

The members 24, 25 and 26 are provided with gas (generally pressurized air) inlet bores 33, 34 and 35, that communicate internally of respectively associated members 24, 25 and 26, with associated bores such as that 36 for the member 26, and with such bores such as that 36 also communicating with bores such as that 37 to which are threadably connected pressure gauges 38. It will be apparent that each of the gauges 38 is provided with a threaded member 40, for suitable threaded connection with an outer end of an associated said bore 37, and that, with respect to the member 26, the three bores 35, 37 and 36, are in communication internally of the member 26. An identical construction is provided for the members 25 and 24, so that the same need not be repeated herein. Each of the members 24, 25 and 26 is also provided, at its lower end as illustrated in FIG. 1, with a battery-cell fill nozzle 41, having a washer-like portion 42 and a frusto-conically configured air outlet 43, and with a gasket 44 being provided on the upper surface of the washer-like portion 42, and with a threaded portion 45 also being provided adapted for threaded engagement in the lower end of an associated bore such as that 36 of one of the members 24, 25 and 26.

A lower rubber gasket such as that 47 may be provided for each air outlet portion 43 as illustrated in FIG. 1, in order to assure tight seating of the members 24, 25 and 26, on their respectively associated battery cells, with the gasket 47 having holes 48 therein, for receipt of the inlet portions 43 of the nozzles 41, and for passage of air therethrough.

A check valve 50 is provided for each of the air-inlet bores 33, 34 and 35, with the valves 50 being adapted to be threadably secured therein, and being adapted to permit the passage of air into an associated one of the members 24, 25 and 26, but not to permit the passage of air outwardly from said members through the check valve 50. The check valve 50 may thus be of a commercially available type that will function in the intended manner. Each check valve 50 is provided with flexible tubing or hose 51 adapted for delivering compressed air thereto, except that the check valve directly connected to the center member 25 may be directly threaded by a close nipple 52, to a universal fitting 53 without hose 51, and with the hoses 51 from the other check valves 50 being connected also to the fitting 53. The fitting 53 may thus take the shape of an X-configuration, having a gas inlet 54 connected to a suitable source of compressed air or the like, adapted for distribution through the fitting 53, to the close nipple 52, and to the hoses 51, and also through an outlet port 55 at the upper end thereof, with the outlet port 55 being adapted to be covered, for example, by the thumb of a user or the like, or opened by the removal of the thumb of a user.

It will thus be apparent that when the fill nozzles 41 are disposed in holes or openings of battery cells, and air is supplied to the members 24, 25 and 26, through the fitting 53, the hand of a user, mechanic or the like will be disposed such that his thumb may cover the hole 55, such that, with the device 10 being firmly seated on a battery such that air will not escape with respect to the cells, the air will communicate interiorly of the cells being checked, and then the mechanic's thumb will be removed from the port 55, in order to allow air being delivered to by-pass therethrough, so that no further air will be delivered through the check valve 50, and that air "captured" in such a manner within the battery cells, the members 26, 25, or 24, and their associated gauges such as 38 will register on the gauges 38. It will also be apparent that the gauges 38 may be constructed to give a visual indication of the actual pressure within the cell, or may be constructed only to give an indication if a given cell is holding pressure or not.

It will be noted that, in placement of the members 24, 25 and 26 over battery cell openings, with fill nozzles 41 in communication with such openings, through gaskets 47, such members 24, 25 and 26 will be in seated relation with respect to the battery cell openings, and will be substantially airtight in order to hold air pressure for the purpose of testing the battery cells. It will also be understood that the gauges 38 are "for indicating pressure," and that such can either actually indicate a numerical value of pressure, or can readily indicate whether or not an acceptable level of pressure is being held, without indicating the precise numerical value of the same.

It will further be noted that while a source of gas is supplied through the nipple 54, such could comprise a plurality of sources of gas, if desired, it however being convenient to utilize only a single source of gas, for ease in terminating delivery of gas to the members 24, 25 and 26, by an operator merely lifting his thumb from the relief port 55, upon supplying sufficient pressurized gas (air) to the members 24, 25 and 26, through the one-way valve 50. Moreover, it will be noted that batteries are described herein as having "outside walls" that includes any outside wall, top, bottom, or side, as distinguished from a separating wall that extends between battery sidewalls and separates adjacent cells from each other.

In the testing of a battery having six-cells, three members 24, 25 and 26, as illustrated in FIG. 1 would be utilized, with readings taken as discussed above, to determine the pressure in, for example, the first, third and fifth-cells, and with readings then being taken to determine the pressure in the second, fourth and sixth-cells. If two adjacent cells both record a loss in pressure, it will be apparent that it is likely that the leak is in a cell separator, rather than in a cell outside wall, and such will indicate the location at which the battery must be repaired, if it is to be repaired. If only one such cell tests in such a manner as not to hold pressure, then it will be understood that the leak is in an outside wall. Similarly, two such members such as 24 and 25 would be utilized in testing a four-cell battery. Moreover, any number of such units could be utilized in testing a battery having additional numbers of cells, all within the spirit and scope of the invention.

While various modifications may be made in the details of construction, as well as in the use and operation of the device of this invention, such are intended to be within the spirit and scope of the invention as defined in the appended claims.

What is claimed is:

1. A testing device for use in determining the existence of leaks in battery cells, comprising a plurality of gas-receiving members, means associated with each said member for seating said members in substantially air-tight relationship in battery cell openings, said members so spaced from each other as to seat against alternate cell openings only, means for facilitating the supplying of pressurized gas individually to a plurality of battery cells through a said member and seating means associated therewith, and separate pressure indicating means connected to each said member for indicating the gas pressure therein and in a battery cell associated and in communication therewith, wherein said means facilitating the supplying comprises a source of pressurized gas and delivery means connecting said source to each said member, including a check valve disposed near the inlet to each said member comprising means for facilitating the maintaining of the pressure within a member and indicating means associated with a given non-leaking cell when the member associated therewith is connected thereto in substantial air-tight relationship therewith, when the incoming supply of gas is terminated, including manually operable means associated with said delivery means for terminating the delivery of gas to said members wherein said terminating means comprises a delivery fitting having a hole therein for disposition of thumb of a user thereover after gas has been supplied to members in seated relation on cells through check valves associated therewith.

2. The device of claim 1, including a common mounting bracket on which said members are disposed in mounted relation.

3. The device of claim 2, wherein means are provided readily detachably mounting said members.

4. The device of claim 2, wherein said mounting bracket includes means facilitating adjustable positioning of at least one of the said members thereon.

5. The device of claim 4, wherein there are three said members, one fixedly mounted against adjustment relative to the said bracket, and two adjustably mounted relative to said bracket, and wherein said means facilitating adjustable positioning includes slotted holes in said bracket, and with fastening protrusions carried by said members and disposed through said slotted holes.

6. The device of claim 2, wherein handle means is provided connected to said bracket for facilitating carrying thereof.

7. The device of claim 1, wherein said means for seating include gaskets.

8. A testing device for use in determining the existence of leaks in battery cells, comprising a plurality of gas-receiving members, means associated with each said member for seating said members in substantially air-tight relationship in battery cell openings, said members so spaced from each other as to seat against alternate cell openings only, means for facilitating the supplying of pressurized gas individually to a plurality of battery cells through a said member and seating means associated therewith, and separate pressure indicating means connected to each said member for indicating the gas pressure therein and in a battery cell associated and in communication therewith, including a common mounting bracket on which said members are disposed in mounted relation, wherein means are provided readily detachably mounting said members, wherein said mounting bracket includes means facilitating adjustable positioning of at least one of the said members thereon, wherein there are three said members, one fixedly mounted against adjustment relative to the said bracket, and two adjustably mounted relative to said bracket, and wherein said means facilitating adjustable positioning includes slotted holes in said bracket, and with fastening protrusions carried by said members and disposed through said slotted holes, wherein said pressure indicating means comprise gauges having pressure indicating graduations on scales thereof, wherein said means facilitating the supplying comprises a source of pressurized gas and delivery means connecting said source to each said member, including a check valve disposed near the inlet to each said member comprising means for facilitating the maintaining of the pressure within a member and gauge associated with a given non-leaking cell when the member associated therewith is connected thereto in substantial air-tight relationship therewith, when the incoming supply of gas is terminated, including manually operable means associated with said delivery means for terminating the delivery of gas to said members, wherein said terminating means comprises a delivery fitting having a hole therein for disposition of thumb of a user thereover after gas has been supplied to members in seated relation on cells through check valves associated therewith, wherein handle means is provided connected to said bracket for facilitating carrying thereof, wherein said means for seating include gaskets.

9. A method of testing battery for leaks both between adjacent cells and through an outside wall thereof comprising supplying pressurized gas simultaneously to alternate cells only through openings thereof and then terminating the supply while preventing the discharge of the gas back through the openings, reading the pressure indication of the plurality of cells tested, and then similarly testing the cells disposed immediately adjacent to those originally tested for comparison of pressure indications of the initial and latter tested cells, wherein the step of terminating the supply comprises manually uncovering to atmospheric pressure an opening in the gas supply.

* * * * *